United States Patent [19]

Ritz

[11] Patent Number: 4,686,930

[45] Date of Patent: Aug. 18, 1987

[54] SPRINKLE BELT

[75] Inventor: Paul Ritz, Marblehead, Ohio

[73] Assignee: Stein Associates, Inc., Sandusky, Ohio

[21] Appl. No.: 729,811

[22] Filed: May 2, 1985

[51] Int. Cl.⁴ .............................................. B05C 19/00
[52] U.S. Cl. ...................................... 118/24; 118/308
[58] Field of Search ..................... 118/24, 308, 25, 312

[56] References Cited

U.S. PATENT DOCUMENTS

| | | | |
|---|---|---|---|
| 3,647,189 | 3/1972 | Johnson | 118/24 X |
| 4,210,074 | 7/1980 | Laughman | 118/24 X |
| 4,270,486 | 6/1981 | Leverenz | 118/24 X |
| 4,496,084 | 1/1985 | Booth et al. | 118/17 X |

Primary Examiner—John P. McIntosh
Attorney, Agent, or Firm—Baldwin, Egan, Hudak & Fetzer

[57] ABSTRACT

A sprinkle belt that is operable in a breading machine for coating food products with various kinds of flour type breading to insure that the top coating is evenly applied and relatively light rather than a heavy or clumpy coating as normally applied by present breading machines. As herein disclosed, the preferred embodiment of sprinkle belt comprises an endless wire mesh belt movably disposed in a breading machine of the type disclosed in the assignee's copending application entitled Breading Machine, Ser. No. 421,169 filed on Sept. 22, 1982 now U.S. Pat. No. 4,496,084, and which belt is operable to intercept the discharge of flour breading from the machine hopper as it falls toward food products passing therebelow to disperse said discharged breading into a cloud-like curtain that is substantially evenly and relatively lightly applied as a top coating to the food product.

5 Claims, 4 Drawing Figures

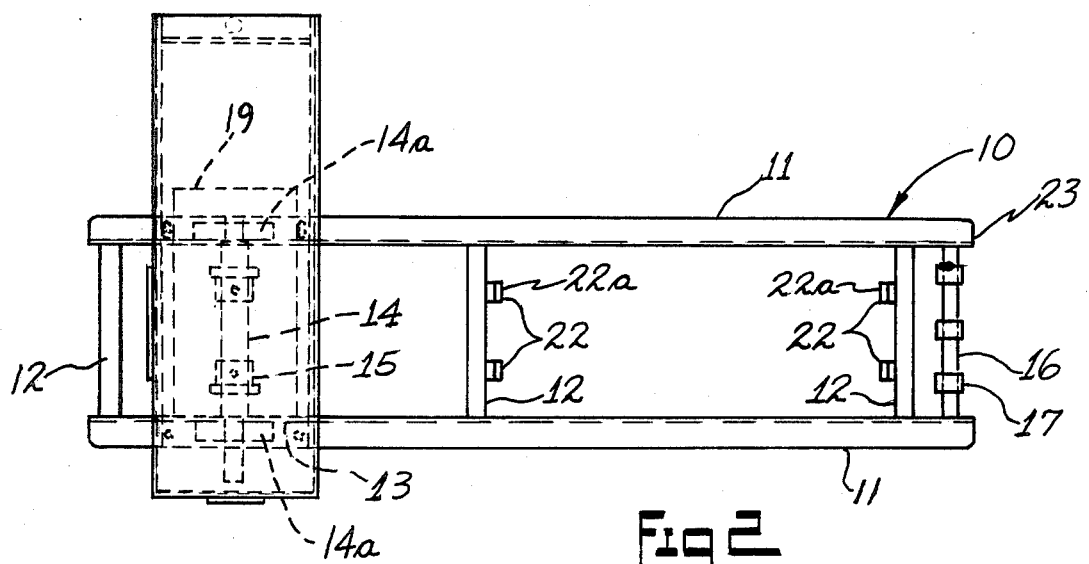
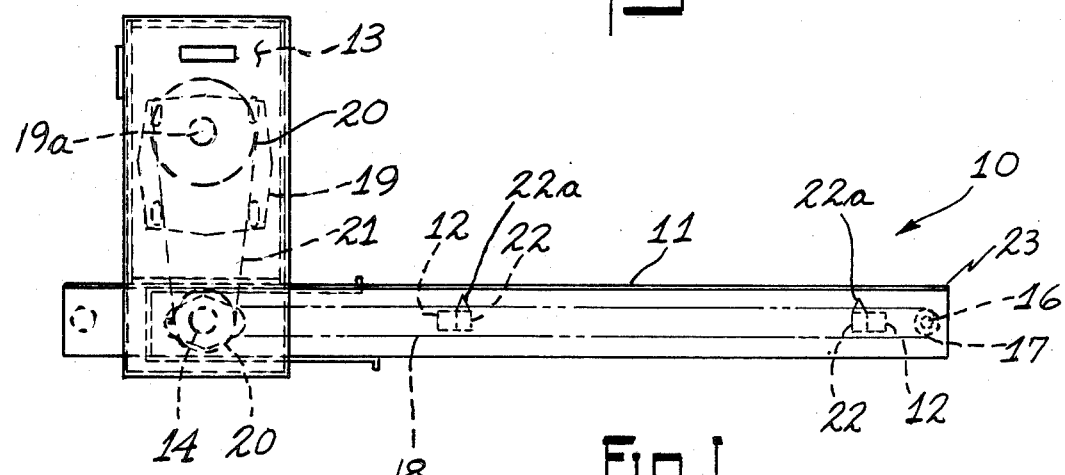
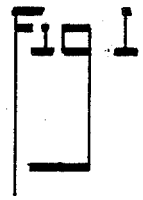

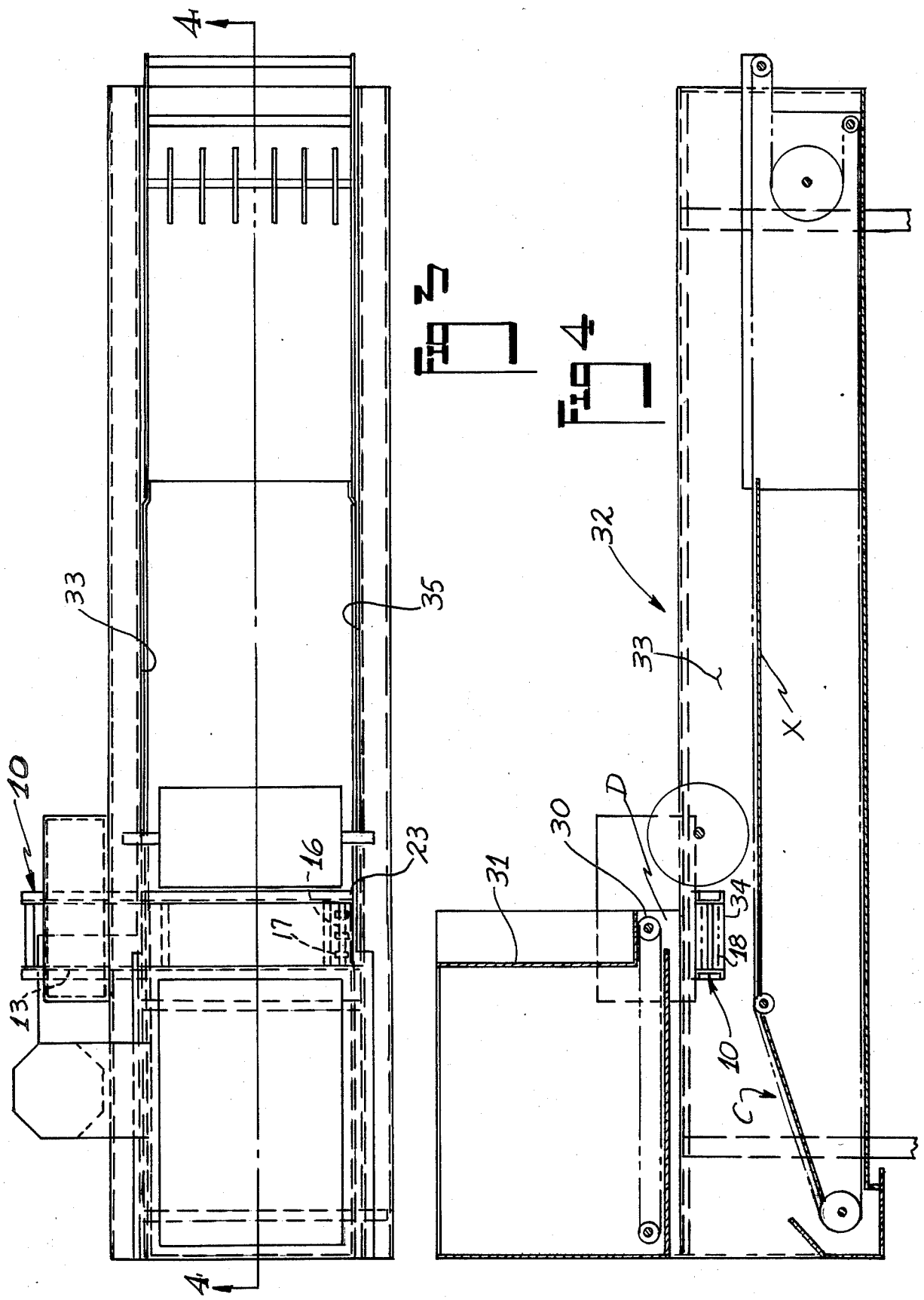

SPRINKLE BELT

This invention relates to a special sprinkle belt which may be mounted in a breading machine for coating food products with various material, the purpose of the sprinkle belt being to insure that the food product being coated in the breading machine has a top coating which consists of a relatively light dusting of flour type breading that is evenly applied rather than the usual heavy and/or clumpy flour coating such as that applied by normal breading machines.

BACKGROUND

In the field of large scale production of prepared foods, a large variety of food pieces are machine coated with batter and breading before being fried in deep fat. This invention relates solely to conveyor belt type breading machines which coat the food product with a flour type breading.

Flour type breading usually has the appearance of normal wheat flour, although it may be formulated to include other material such as spices, starch, other grain flours, etc. Flour type breadings all have a tendency to pack in loose clumps, and in general, they will not flow freely out of the hopper of a breading machine, but must be mechanically discharged from that hopper. One type of discharge mechanism is described in U.S. patent application Ser. No. 421,169, filed on Sept. 22, 1982 (now U.S. Pat. No. 4,496,084 dated Jan. 29, 1985, directed to Breading Machine and assigned to the same assignee, wherein a moving open mesh wire belt pulls the flour breading from the hopper to discharge the flour onto food product pieces passing below the discharge opening.

During the coating of many types of food such as chicken parts, the desirable top coating of flour may be three-quarters of an inch thick or more, to insure that crevices in the food product, and sides of the pieces, are all coated. Conventionally, excess flour coating is removed by flipping or tumbling the food pieces one or more times on an open mesh belt or the like, so that the excess flour may fall through the mesh and be returned to the breading machine hopper for reuse.

However, in some instances, the food pieces cannot be flipped or tumbled to remove excess flour, nor is removal of large excesses of flour by air knife practical due to dust being blown about by the air knife. Such food pieces include most raw meat patties wherein the thickness dimension is far less than any other dimension, so that the patties have a tendency to fold if flipped. Or, if the plan view of the patty is irregular, or other than round, it is also very difficult to keep patties from landing on edge while being flipped. Therefore, it is desirable to add only a light coating of flour as evenly as possible so that excess coating is minimized and flipping is not necessary.

The normal discharge of flour from the hopper of the type as described in U.S. patent application Ser. No. 421,169, and from other similar types of flour hoppers, is oftentimes in loose clumps which may range from tiny to thimble size. These clumps make no meaningful difference when a thick top coating is desired, but when a thin top coating is desired, a light discharge of clumps may coat some areas of product up to ½" thick, yet leave other areas bare.

The sprinkle belt of the present invention is intended to overcome the above deficiency among other hoppers known to the art, and therefore a primary object of this invention is to provide a mechanism for receiving the normal clumped top cover discharge from a flour hopper and distributing that discharge thinly and evenly upon the product pieces passing below.

Another object of this invention is to provide a mechanism as thus defined which is operable to eliminate the normal heavy top coating of flour as applied to food product pieces in the usual flour type breading machine, yet is operable to coat the top of the food product in an acceptable manner.

Another object is to provide a mechanism as thus defined which eliminates the necessity for flipping or tumbling food product pieces to remove excessively heavy top coating of flour.

Another object of this invention is to provide means in a flour type breading machine which will insure that the food pieces being coated in this machine are lightly and evenly coated on their top surface.

Additional objects and advantages of the sprinkle belt of the present invention will become apparent to one skilled in the art which it relates, and upon reference to the following disclosure of a preferred embodiment thereof, as illustrated in the accompanying drawings wherein:

BRIEF DESCRIPTION OF THE DRAWINGS

FIG. 1 is a side elevation of the sprinkle belt mechanism of this invention;

FIG. 2 is a top plan view of the sprinkle belt mechanism of this invention;

FIG. 3 is a top plan view of the top flow hopper of a breading machine showing the sprinkle belt mechanism of this invention installed under the hopper discharge;

FIG. is a sectional view taken on line 4—4 of FIG. 3, showing the vertical relationship between a breading machine hopper and the sprinkle belt mechanism of this invention.

BRIEF DESCRIPTION OF THE INVENTION

The sprinkle belt of this invention comprises preferably an endless open-mesh wire belt that is mounted adjacent the discharge opening of a top flow hopper such as the type of hopper disclosed in the assignee's pending application entitled Breading Machine, Ser. No. 421,169 filed on Sept. 22, 1982. Te sprinkle belt moves across and underneath the discharge opening such that the flour being discharged therefrom is dispersed substantially evenly as a curtain or cloud thereacross as it falls onto the food product passing therebelow.

DESCRIPTION OF PREFERRED EMBODIMENT

Referring now to FIGS. 1, 2 and 4, the sprinkle belt mechanism 10 of this invention comprises an endless wire mesh belt 18 suspended between driving shaft 14 and tail shaft 16 so as to be located below the discharge opening D of the top flow hopper 31 of the breading machine 32. As aforementioned, breading machine 32 may be of the type disclosed in copending patent application Ser. No. 421,169.

The sprinkle belt mechanism 10 is intended to be removably mounted in the breading machine 32, and includes elongate side frame members 11 disposed in longitudinal parallel extension by cross bar members 12 extending between and interconnecting to the side frame members 11 at spaced intervals.

A drive mounting plate 13 is suitably attached at its lower edge to one side frame member 11 adjacent the left end of the mechanism 10 as seen in FIG. 1, and extends vertically upwardly therefrom, being thus positioned to support the drive for belt 18.

As best seen in FIG. 2, the opposed ends of the driving shaft 14 are rotatably journalled within bearing blocks 14a mounted on the side frame member 11. In like manner the tail shaft 16 may be rotatably mounted and suspended between the side frame members 11 at the opposite ends thereof.

A drive motor 19 is attached to and supported by mounting plate 13 to be thus located directly over the driving shaft 14. Motor 19 may be an electric motor or an hydraulic motor as desired, to match the main drive of breading machine 32. Chain sprockets 20 are mounted on the shaft 19a of drive motor 19 and on one end of driving shaft 14 in vertical alignment. An endless roller chain 21 extends around both chain sprockets 20 to thus drivingly connect the drive motor 19 to the driving shaft 14.

As best seen in FIG. 2 drive gears 15 are carried on shaft 14 in spaced relation to each other, and drivingly engage the upper run of the belt 18 sufficiently to move the same from right to left as viewed in FIG. 2.

As likewise seen in FIG. 2, collars 17 mounted on the tail shaft 16 enable the belt 18 to move smoothly around the tail shaft 16. Small nylon blocks 22 mounted on the cross bar members 12 are formed with peaked tops 22a which are disposed in the path of the upper run of belt 18 being operable to slightly interfere with the movement thereof whereby the upper run of belt 18 is slightly agitated or vibrated.

Sprinkle belt 18 is of the open mesh wire construction known as flat flex belt as made by Wire Belt Co. of America. The belt is constructed so that there are 42 to 72 cross wires per foot of belt length. The higher number of cross wires is preferred.

Referring to FIGS. 3 and 4, the sprinkle belt mechanism 10 may be seen mounted in place under the discharge means 30 of top flow hopper 31 of a breading machine 32. The mechanism 10 may be removably mounted in a number of ways. One simple way is to furnish a slot 34 in side wall 33 of breading machine 32, slot 34 being large enough to permit the lengthwise entry of mechanism 10 so that tail shaft 16 may be in close proximity to side wall 35 of breading machine 32, and drive mounting plate 13 may remain outside the opposite side wall 33 of breading machine 32, with both runs of belt 18 being in horizontal planes, and with the longitudinal center line of belt 18 being parallel to and directly under the transverse center line of the discharge means 30 of hopper 31.

The tail shaft end 23 of mechanism 10 may rest on a suitable bracket (not shown) fixed to the inside of breading machine side wall 35. A suitable latching means (not shown) may then be utilized to hold mechanism 10 in position shown in FIG. 3 and 4. The plane of the top run of belt 18 is preferably from one to two inches below the discharge means 30 of hopper 31. This position permits flour clumps to fall free of discharge means 30, yet this position still permits thin flat food pieces as previously described to pass beneath mechanism 10 on upper run X of the food conveyor C of the breading machine 32. When thicker food pieces such as chicken parts are processed in breading machine 32, the sprinkle belt mechanism 10 may not be utilized and is then removed. When sprinkle belt mechanism 10 is installed in breading machine 32 as shown in FIGS. 3 and 4, the top run of sprinkle belt 18 preferably moves away from wall 35 and toward wall 33 of breading machine 32. The bottom run of belt 18 then moves in the opposite direction. With this assembly, flour clumps falling from discharge mechanism 30 of hopper 31 fall through two runs of belt moving in opposite directions, and the cross wires of these belt runs separate the flour clumps into their component particles to form a substantially even cloud of flour falling across the width of the upper run X of the food product conveyor C.

The linear speed of sprinkle belt 18 is of some importance. Almost any speed above about ten feet per minute will break up flour clumps to some extent. However, the best nominal speed for belt 18 is about fifty to seventy feet per minute. This speed insures that all clumps are broken up to provide a fine dust cloud of dispersed flour particles which falls onto product pieces below. This speed is also sufficient to insure that the cross wires of belt 18 are moving sufficiently fast that little or no flour sticks to the belt 18 to be carried out of the breading machine 32. Belt speeds higher than seventy feet per minute are easy to obtain and do not appear to be troublesome, but neither are they particularly beneficial. Belt speeds lower than about thirty feet per minute will permit some flour to be carried out of the breading machine 32 by belt 18, which is disadvantageous and wasteful of flour, therefore the higher speeds as described are preferred, because they are in a safe speed range.

The product coverage obtained from flour clumps as delivered by a typical flour type breading machine such as described in the aforementioned pending application Ser. No. 421,169, and the coverage obtained by use of the sprinkle belt have been briefly described above. To further illustrate the objects and advantages of the sprinkle belt of the present invention, if a clump of flour of approximately 0.12 cubic inch is dropped from a height of five inches onto a nominally flat damp product which is not moving, the resultant distribution may be up to ¼ to ½ inches thick at point of impact and radiate irregularly to a diameter of about 1½ inches. A smaller clump will naturally show a smaller peak and diameter. Also, the diameter of the flour mark will be smaller if the product is coated with batter rather than being just damp. Finally, if the product is moving, the mark is further distorted.

However, the same size clump of flour dropped onto an operating sprinkle belt from a height of two inches above the top run of the belt will be broken up into a dust cloud which settles fairly evenly to an elliptical pattern about 2 inches wide by four inches long, with a faint comet-like tail. The flour layer thus formed will not be totally even in thickness and product will be more visible through some parts of the layer than through other parts of the layer, but no clumping is evident. Coating layer uniformity is little affected whether the receiving surface is wet, dry, still or moving.

It may now be fully understood that a light top coating of flour delivered by a typical breading machine without the use of a sprinkle belt will give the appearance of peaks and valleys, some peaks up to ½ inch thick and some valleys almost bare, whereas the same flow rate of top coating may be passed through the two runs of a sprinkle belt to even out the coverage and minimize variations in thickness. In practice, the top flow rate may be further decreased so that it is possible to obtain a nearly even coating of flour as little as one-thirty second of an inch thick. A thin coating such as this is often acceptable without removing any excess, totally eliminating the problems associated with such removal as described earlier.

Nylon vibrator blocks 22 serve to insure that all parts of all flour clumps pass through sprinkle belt 18 to the product below. The peaked top 22a of each block 22 is formed of two surfaces at ninety degrees to each other, each surface being at forty-five degrees to a horizontal plane. The junction line of the two top surfaces is parallel to the cross wires of the sprinkle belt, so that each cross wire first climbs a forty-five degree slope, then descends a forty-five degree slope. This movement up and down of the sprinkle belt cross wires serves to jar or vibrate the sprinkle belt sufficiently to dislodge and break up any flour clumps. This means of vibrating an open mesh belt to shake flour through the belt is well known in the related art.

Having thus described a preferred embodiment of sprinkle belt mechanism of the present invention it should be noted that it is not limited to its preferred form. For instance the sprinkle belt could be one of several other configurations, such as a balanced weave wire mesh which is commercially available in dozens of weaves. The direction of belt travel could be reversed. The mechanism might be turned in a horizontal plane and become much wider than its length. Fewer wires per foot of belt length might be utilized, with a higher belt speed compensating for larger spaces between cross wires. The configuration of vibrators 22 may be considerably modified from that described, and they may even be mechanically driven if desired.

I claim:

1. In a conveyor type breading machine for coating food product pieces with flour type breading, said breading machine having an elevated hopper to supply flour for coating the top of said foot product, said hopper having a discharge means for metering the flour for top coating the food product as it passes therebelow on conveyor means; sprinkle means mounted below said discharge means and above said conveyor means, said sprinkle means operating to finely disperse metered flour falling from said discharge means toward the food product, whereby the top of the food product may be lightly and evenly coated with a uniform thickness of the flour, said sprinkle means comprising an endless open mesh wire belt movably mounted over said conveyor means and positioned to intercept the flour falling from said discharge means, said endless mesh belt including cross wires in the range of from about 42 to 72 wires per foot of belt length, motor means for driving said endless belt at a predetermined speed operative to move both the upper and lower runs of said belt in a direction generally transverse to the direction of movement of said conveyor means, vibrating means engageable with said endless belt and operable to vibrate said endless belt as it moves relative to said conveyor means, movement of said endless belt operative to break up any clumps of flour emitted by said discharge means and provide a relatively fine even dust cloud of the flour for even coating of the underlying food product.

2. The mechanism as defined in claim 1 and wherein said motor means is actuatable to move the upper and lower runs of said belt at a speed of at least above about ten feet per minute.

3. The mechanism as defined in claim 1 and wherein said endless belt is mounted in a frame removably disposed in the breading machine, belt support means in said frame and said vibrating means in engagement with the upper run of said endless belt effective to vibrate the same as it moves relative to the said conveyor means, said sprinkle means, including said frame and endless belt and motor means, being slidably mounted in a slot in the breading machine for ready removal therefrom, said mesh belt being driven by said motor means at a speed of at least above about ten feet per minute with said upper and lower runs of said belt being disposed in a respective generally horizontal plane.

4. In a conveyor type breading machine for coating food product pieces with flour type breading, said breading machine having an elevated hopper to supply flour for coating the top of the food product pieces, with the hopper having discharge means for metering the flour for such top coating of the food product pieces as they pass below on a conveyor means; the combination therewith of sprinkle means mounted below said discharge means and above said conveyor means and comprising an endless open mesh wire belt movably mounted over said conveyor means and positioned to intercept the flour falling from said discharge means, said mesh belt including cross wires in the range of from about 42 to 72 wires per foot of belt length, motor means for driving said endless belt at a speed of at least above about ten feet per minute and preferably within the range of from about 50 to about 70 feet per minute, effective to move the generally horizontal upper and lower runs of said belt relative to said conveyor means in a direction generally transverse to the direction of movement of said conveyor means, vibrating means engageable with said endless belt and operable to vibrate said endless belt as it moves relative to said conveyor means, said sprinkle means being operable to break up any clumps of breading flour and providing a relatively fine even dust cloud of the flour for coating of the food product pieces.

5. The mechanism in accordance with claim 4 wherein said sprinkle means including said endless belt and said motor means is mounted on a frame comprising a sub-assembly which is readily removable from a slot in the side of the remainder of said breading machine so that said sprinkle means can be readily removed from the remainder of the breading machine.

* * * * *